United States Patent [19]

Yamasaki et al.

[11] Patent Number: 4,983,115

[45] Date of Patent: Jan. 8, 1991

[54] MOLDING APPARATUS FOR SEALING SEMICONDUCTOR DEVICES INCLUDING A MOLD CLEANING DEVICE

[75] Inventors: Katuhiko Yamasaki; Minoru Tanaka; Kenichiro Sakamoto, all of Fukuoka, Japan

[73] Assignee: Mitsubishi Denki Kabushiki Kaisha, Japan

[21] Appl. No.: 256,466

[22] Filed: Oct. 12, 1988

[30] Foreign Application Priority Data

Oct. 19, 1987 [JP] Japan .................................. 62-264155

[51] Int. Cl.⁵ ...................... B29C 45/02; B29C 45/17
[52] U.S. Cl. ................................. 425/228; 264/39; 425/229; 425/231
[58] Field of Search ............ 425/225, 227, 228, 229, 425/231; 264/39; 15/21 E, 256.51, 256.53

[56] References Cited

U.S. PATENT DOCUMENTS

| | | | |
|---|---|---|---|
| 3,086,431 | 4/1963 | Perry, Jr. | 425/227 |
| 3,479,678 | 11/1968 | Jeffreys | 15/21 |
| 3,690,801 | 9/1972 | Hutz et al. | 425/229 |
| 3,801,251 | 4/1974 | Coscia | 425/229 |
| 3,941,537 | 3/1976 | Abraham | 425/228 |
| 4,615,184 | 12/1986 | Tassoni | 15/77 |
| 4,626,184 | 12/1986 | Hammond | 264/167 |

FOREIGN PATENT DOCUMENTS

| | | | |
|---|---|---|---|
| 3511797 | 5/1986 | Fed. Rep. of Germany | 425/229 |
| 232873 | 2/1986 | German Democratic Rep. | 425/228 |
| 59-76207 | 1/1984 | Japan . | |
| 61-148016 | 7/1986 | Japan | 425/227 |

Primary Examiner—Richard L. Chiesa
Assistant Examiner—Khanh P. Nguyen
Attorney, Agent, or Firm—Leydig, Voit & Mayer

[57] ABSTRACT

A molding apparatus has a fixed upper platen and a movable lower platen on which are secured an upper and a lower mold half, respectively. A cleaning device for cleaning the mold surfaces of the mold halves is installed on the upper platen, and the lower platen is open so that foreign matter will not accumulate atop it.

4 Claims, 1 Drawing Sheet

MOLDING APPARATUS FOR SEALING SEMICONDUCTOR DEVICES INCLUDING A MOLD CLEANING DEVICE

BACKGROUND OF THE INVENTION

This invention relates to a molding apparatus and method for sealing semiconductor devices in a resin, and more particularly, it relates to a molding apparatus and method in which a cleaner is provided for cleaning the surfaces of the mold of the molding apparatus.

Semiconductor devices are frequently sealed in a resin in order to protect them from the environment. A molding machine for sealing a semiconductor device in a resin generally comprises an upper mold half and a lower mold half which are respectively secured to a fixed upper platen and a movable lower platen. By raising and lowering the lower platen using a press, the two mold halves can be brought into and out of contact with one another.

It is conventional for this type of molding machine to be equipped with a cleaning device having rotating brushes which are moved back and forth across the surfaces of the mold halves to clean off any molding burrs, dust, and other foreign matter adhering to the mold surfaces after molding is performed. The foreign matter which is removed by the brushes is then blown off the mold surfaces by compressed air.

This type of cleaning device is usually mounted on the lower platen of the molding machine, and some of the foreign matter which is removed from the surfaces of the mold halves falls into the space atop the lower platen between the cleaning device and the lower mold half. As access to this space is difficult, foreign matter tends to accumulate in this location, and when the lower platen is lowered after molding, it is easy for some of this foreign matter to end up inside the lower mold half. If the foreign matter is present in the mold when the semiconductor device is sealed with a resin, the foreign matter can produce molding defects and impair the operation of the semiconductor.

SUMMARY OF THE INVENTION

Accordingly, it is an object of the present invention to provide a molding apparatus and method for sealing semiconductor devices in which foreign matter does not accumulate atop the lower platen of the molding apparatus.

In accordance with the present invention, a molding apparatus has a cleaning device which is mounted on the upper platen of a molding apparatus instead of on the lower platen. As a result, there are no areas on the lower platen which are difficult to clean, so even if foreign matter falls onto the lower platen, it does not accumulate atop the lower platen and re-enter the mold halves.

A molding apparatus in accordance with one aspect of the present invention comprises an upper platen, a lower platen which opposes the upper platen, at least one of the platens being movable towards the other, an upper mold half which is secured to the upper platen, a lower mold half which is secured to the top surface of the lower platen opposing the upper mold half, and cleaning means for cleaning the opposing mold surfaces of the upper and lower mold halves, the cleaning means being installed on the upper platen.

A molding method using the above-described molding apparatus in accordance with another aspect of the present invention comprises the steps of: sealing a semiconductor device in a resin inside the upper and lower mold halves; removing the semiconductor device from the mold halves after the completion of sealing; moving the cleaning means, which is installed on the upper platen and has a pair of brushes, toward the mold halves so that the brushes are placed in contact with the confronting surfaces of the upper and lower molds; and causing the brushes of the cleaning means to move back and forth parallel to the opposing surfaces of the upper and lower molds while being rotated so as to remove molding burrs, dust and other foreign matter which adhere to the mold surfaces.

The cleaning means which is employed in the present invention need not have any particular structure, but in a preferred embodiment, it comprises brushes which are rotated while being moved back and forth parallel to the mold surfaces of the upper and lower mold halves in contact with the mold surfaces.

In a preferred embodiment, the brushes are moved slightly up and down towards and away from the mold surfaces at the same time that they are rotated. This up and down movement increases the cleaning ability of the brushes.

In the preferred embodiment, the upper platen of the molding apparatus is stationary while the lower platen is movable, but it does not matter which of the two platens is movable.

BRIEF DESCRIPTION OF THE DRAWINGS

In the drawings, the same reference numerals indicate the same or corresponding parts.

DESCRIPTION OF THE PREFERRED EMBODIMENT

Figure 1:
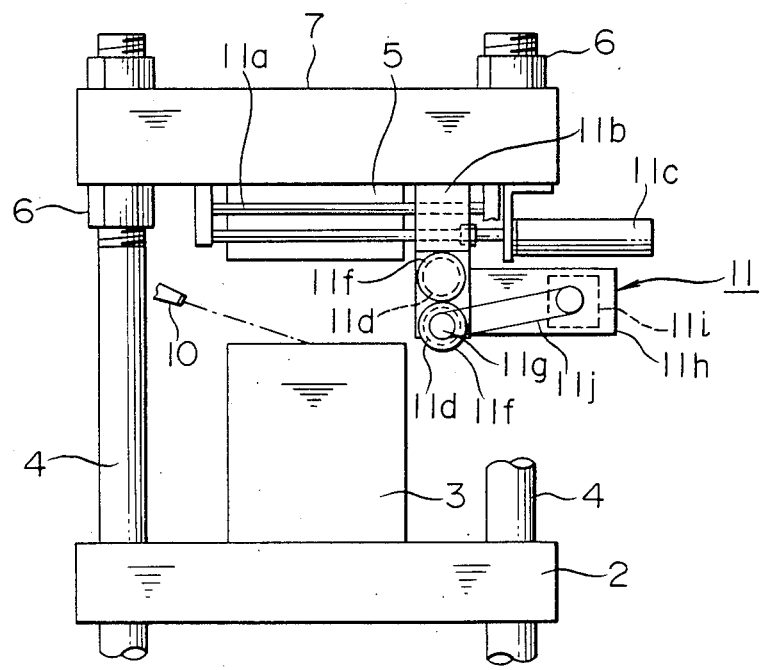
FIG. 1 is a front elevation of an embodiment of a molding apparatus in accordance with the present invention.
Figure 2:
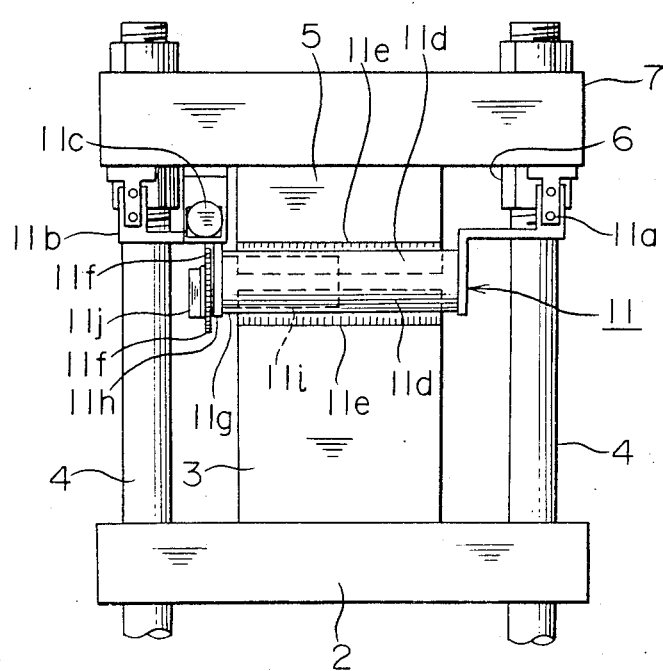
FIG. 2 is a side elevation of the embodiment of FIG. 1.

A preferred embodiment in accordance with the present invention will now be described while referring to FIGS. 1 and 2, which are respectively a front elevation and a side elevation of a molding apparatus. As shown in these figures, the molding apparatus has an unillustrated base to the top of which four vertical guide rods 4 are secured. A lower platen 2 is equipped with unillustrated bushings which loosely fit over the guide rods 4 so as to enable the lower platen 2 to slide up and down the guide rods 4. The lower platen 2 can be raised and lowered by an unillustrated press which is housed within the base. A lower mold half 3 is secured to the top surface of the lower platen 2. An upper platen 7 which is parallel to the lower platen 2 is rigidly secured to the upper ends of the guide rods 4 by means of securing nuts 6. An upper mold half 5 is secured to the underside of the upper platen 7 opposing the lower mold half 3. The lower mold half 3 can be made to contact and separate from the upper mold half 5 by the raising and lowering of the lower platen 2 by the unillustrated press.

A cleaning device 11 is mounted on the underside of the upper platen 7 in the vicinity of the upper mold half 5. It has a plurality of parallel guide rods 11a which are secured to the upper platen 7 and extend parallel thereto on either side of the upper mold half 5. The body 11b of the cleaning device 11 is slidably mounted on these guide rods 11a. The body 11b can be moved back and forth along the guide rods 11a by the operation of a ram 11c which is secured to the underside of the upper platen 7. The ram 11c has a piston whose outer end is secured to the body 11b so that when the piston is advanced or retracted by the ram 11c, the body 11b moves back and forth horizontally. Two cleaning units 11d are rotatably supported by the body 11b. Each of the cleaning units 11d is generally in the form of a cylinder which extends horizontally at right angles to the guide rods 11a and which has a brush 11e formed on its outer surface. The left end of each of the cleaning units 11d in FIG. 2 has a gear 11f secured to it, and the two gears 11f are constantly engaged with one another. A pulley 11g is also secured to the end of the lower cleaning unit 11d next to the gear 11f. The brush 11e and the gear 11f of the upper cleaning unit 11d are coaxial, and the upper cleaning unit 11d is journalled to freely move up and down while it rotates. The brush 11e and the gear 11f of the lower cleaning unit 11d are also coaxial, but the pulley 11g is slightly eccentric with respect thereto. The brush 11e, the gear 11f, and the pulley 11g of the lower cleaning unit 11d are rotated about an axis which passes through the center of the pulley 11g.

A frame 11h which extends horizontally from the body 11b beneath the ram 11c has an electric motor 11i secured thereto. The motor 11i is drivingly connected to the pulley 11g by a belt 11j. Due to the eccentricity of the pulley 11g with respect to the brush 11e of the lower cleaning unit 11d, the brush 11e of the lower cleaning unit 11d moves slightly up and down as it is rotated by the motor 11i. The rotation of the lower cleaning unit 11d is transmitted to the upper cleaning unit 11d by the gears 11f. As the lower gear 11f is eccentric with respect to the pulley 11g, it produces a camming action as it rotates and causes the brush 11e of the upper cleaning unit 11d to move slightly up and down as it rotates.

The ram 11c is able to move the cleaning units 11d back and forth over the entire length of the confronting surfaces of the mold halves 3 and 5. When the piston of the ram 11c is in its retracted position as shown in FIG. 1, the body 11b and the cleaning units 11d are moved out of the path of movement of the lower mold half 3 so as not to interfere with molding.

The vertical positions of the brushes 11e are chosen so that when the lower platen 2 is in a lowered position as shown in the figure, the brushes 11e will contact the mold surfaces of the mold halves 3 and 5 as the brushes 11e are moved horizontally.

A nozzle 10 which is connected to an unillustrated supply of compressed air is disposed to blow compressed air at the mold surfaces and to blow away foreign matter which is cleaned off by the cleaning units 11d.

The operation of this embodiment is as follows. First, a semiconductor device is sealed in a resin inside the upper and lower mold halves 3 and 5 in a conventional manner. After the completion of molding, the semiconductor device is removed from the mold halves 3 and 5. With the lower mold half 3 in its lowered position as shown in FIG. 1, the body 11b of the cleaning device 11 is then moved towards the mold halves, i.e., towards the left in FIG. 1 by the ram 11c. At the same time, the motor 11i is operated to rotate both of the brushes 11e through the belt 11j, and the rotating brushes 11e are moved back and forth by the ram 11c parallel to the mold surfaces. The brushes 11e of the upper and lower cleaning units 11d contact the mold surfaces of the upper and lower mold halves 3 and 5, respectively. The rotation of the brushes 11e removes molding burrs, dust, and other foreign matter which adheres to the mold surfaces. While the brushes 11e are being rotated, the nozzle 10 blows compressed air at the mold surfaces, and any loose foreign matter which was removed by the cleaning device 11 is blown away from the mold surfaces. After the mold surfaces have been cleaned, the body 11b is then returned to its initial position by the ram 11c and the motor 11i is stopped.

Some of the foreign matter which is removed from the mold surfaces may fall onto the top of the lower platen 2, but as the top surface of the lower platen 2 is unenclosed, the lower platen 2 can be easily cleaned. Therefore, foreign matter does not accumulate atop the lower platen 2, there is less likelihood of its re-entering the mold halves, and superior moldings can be obtained.

What is claimed is:

1. A molding apparatus for sealing a semiconductor device in a resin comprising:
   an upper platen;
   a lower platen opposing said upper platen;
   means for moving one of said platens towards the other platen;
   an upper mold half secured to said upper platen and having a molding surface opposing said lower platen;
   a lower mold half secured to said lower platen opposing said upper mold half and having a molding surface opposing said upper platen;
   an upper brush rotatably supported by said upper platen for rotation about a horizontal axis;
   a lower brush rotatably supported by said upper platen for rotation about a horizontal axis; and
   drive means for rotating said upper brush and moving it across the molding surface of said upper mold half and rotating said lower brush and moving it across the molding surface of said lower mold half and cyclically moving at least one of said brushes towards and away from the molding surface of the respective mold half as it is rotated, said drive means comprising a frame supported by said upper platen for movement parallel to the molding surfaces, one of said brushes being journalled for eccentric rotation on said frame, said other brush being journalled on said frame for moving towards and away from the respective mold half as it rotates and means for converting the rotation of the eccentrically-journalled brush into action for moving said other brush towards and away from the respective mold half.

2. A molding apparatus as claimed in claim 1 comprising means for blowing a gas at one of said mold halves.

3. A molding apparatus as claimed in claim 1 wherein said means for converting rotation comprises a first gear secured to the eccentrically-journalled brush and a second gear which is secured to the other brush and engages with the first gear.

4. A molding apparatus for sealing a semiconductor device in a resin comprising:
   a first platen;
   a second platen which opposes said first platen;
   a first mold half secured to said first platen and having a first molding surface opposing said second platen;
   a second mold half secured to said second platen and having a second molding surface opposing said first platen;

a support frame mounted on said first platen for movement parallel to said first molding surface;

a first brush journalled by said support frame for movement towards and away from the molding surface of said first mold half;

a second brush eccentrically journalled by said frame; and brush drive means for rotating said first brush while cyclically moving it towards and away from said first molding surface and for rotating said second brush while cyclically moving it towards and away from said second molding surface, said brush drive means comprising a first gear secured to said first brush for rotation therewith and a second gear secured to said second brush for rotation therewith and engaging with said first gear.

* * * * *